United States Patent [19]

Frisch et al.

[11] B 3,985,713

[45] Oct. 12, 1976

[54] CYCLIC NITRILES AS CROSSLINKING AGENTS AND COMPOSITIONS THEREFROM

[75] Inventors: Kurt C. Frisch, Grosse Ile; Sidney L. Reegen, Oak Park; Harry L. Bauer, Detroit, all of Mich.

[73] Assignee: Atlantic Richfield Company, Los Angeles, Calif.

[22] Filed: Nov. 15, 1972

[21] Appl. No.: 306,668

[44] Published under the second Trial Voluntary Protest Program on February 3, 1976 as document No. B 306,668.

Related U.S. Application Data

[63] Continuation of Ser. No. 139,951, May 3, 1971, abandoned.

[52] Int. Cl. .................................. 260/77.5 CR; 526/16
[51] Int. Cl. ............................................ C08g 22/00

[58] Field of Search............ 260/80.75, 80.8, 80.81, 260/901, 77.5 CR, 33.6 R, 33.6 UB

[56] References Cited
UNITED STATES PATENTS

| | | | |
|---|---|---|---|
| 3,028,367 | 4/1962 | O'Brien............................ | 260/77.5 |
| 3,245,941 | 4/1966 | Mayer et al...................... | 260/77.5 |
| 3,264,269 | 8/1966 | Rees ................................ | 260/77.5 |
| 3,480,595 | 1/1969 | Burk et al. ...................... | 260/77.5 |
| 3,531,425 | 9/1970 | Burk et al. ...................... | 260/77.5 |
| 3,652,507 | 3/1972 | Burk et al. ...................... | 260/77.5 |

*Primary Examiner*—M. J. Welsh
*Attorney, Agent, or Firm*—Coleman R. Reap

[57] ABSTRACT

Cyclic nitrile adducts are used as crosslinking agents for acrylic interpolymers to produce thermosetting resins having exceedingly high impact resistance. Adipodinitrile carbonate is a preferred cyclic nitrile.

8 Claims, No Drawings

CYCLIC NITRILES AS CROSSLINKING AGENTS AND COMPOSITIONS THEREFROM

This application is a continuation of U.S. application Ser. No. 139,951, filed May 3, 1971 and now abandoned.

BACKGROUND OF THE INVENTION

1. Field of the Invention

This invention relates to thermosetting resin coatings having high impact resistance produced by crosslinking acrylic interpolymers with cyclic nitrile adducts. Adipodinitrile carbonate is a preferred example of the cyclic nitriles.

2. Prior Art

The use of the cyclic nitrile carbonates and similar compounds to make urethane type systems is described in U.S. Pat. No. 3,531,425. This patent describes the preparation of urethane and hydroxamate systems by reacting 1 equivalent of the cyclic nitrile carbonate with 1 equivalent of the polyol, thiol or amino compound. Equivalents are expressed on the basis that 1 hydroxyl, thiol or amino group reacts with 1 cyclic nitrile group. The instant invention differs from the systems described in the aforementioned patent in that the cyclic nitrile adducts are used to crosslink highly complex acrylic interpolymers to produce high molecular weight thermosetting resins which have exceptionally high impact resistance and are particularly suitable for use as coatings for steel and the like in automobile manufacture, i.e. body finishes for automobiles.

SUMMARY OF THE INVENTION

In accordance with the instant invention either low molecular weight cyclic nitrile adducts, such as adipodinitrile carbonate can be employed or unsaturated nitrile adducts can be homopolymerized or copolymerized with polymerizable monomers to produce high molecular weight polycyclic nitrile compounds which can be utilized to crosslink acrylic interpolymers to produce high molecular weight coatings having exceptional impact resistance.

It is an object of this invention therefore, to produce novel high molecular weight thermosetting resins compositions from cyclic nitrile adducts and acrylic interpolymers.

It is another object of this invention to provide novel high molecular weight thermosetting resins having high impact resistance.

It is an additional object of this invention to produce novel high molecular thermosetting resin compositions by crosslinking acrylic interpolymers with di- or poly cyclic nitrile compounds.

It is a specific object of this invention to crosslink acrylic interpolymers with adipodinitrile carbonate to produce high impact resistance thermosetting resins.

Other objects of this invention will be apparent from the description of the invention, the preferred embodiments and from the claims.

DESCRIPTION OF THE INVENTION AND DESCRIPTION OF THE PREFERRED EMBODIMENTS

The thermosetting resin compositions of this invention are obtained by reacting the acrylic interpolymer and the cyclic nitrile adduct in a 1:1 equivalent ratio in the presence of a suitable catalyst. The equivalent weight of the acrylic interpolymer is determined by the hydroxyl and acid numbers. The equivalent weight of the cyclic nitrile adduct is determined from its molecular weight divided by the number of cyclic nitrile groups per molecule. The catalyst employed will be described more fully hereinafter. The reactants and catalysts are heated to about 40°C. to 50°C. under a dry nitrogenous atmosphere to obtain complete solution. The solution is then cast hot as a film on suitable metal panels and cured at 120°C. for 2 hours.

THE CYCLIC NITRILE ADDUCTS

The cyclic nitrile adducts useful in this invention are represented by the structure:

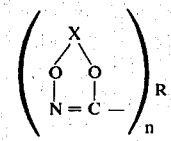

wherein R is an organic radical having from 2 to about 200,000 carbon atoms and is free of nucleophilic groups and can be aliphatic or aromatic including cycloaliphatic, alkaryl or aralkyl radicals. For example, it can be an aliphatic polymeric chain ranging from 2 to about 200,000 carbon atoms or more to which the cyclic nitrile groups are attached. The R may be a hydrocarbon chain or it may be substituted by halogens, nitriles, esters, ethers, carboxylic acid or anhydrides, aldehydes or ketones or combinations of these dependent from the chain. The X is:

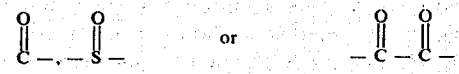

and $n$ ranges from 2 to about 100,000 or more.

The production of the low molecular weight aliphatic and aromatic cyclic nitrile adducts wherein n ranges up to 4 has been described in detail in U.S. Pats. Nos. 3,531,425 and 3,652,507, both incorporated herein by reference. A preferred example of these for use in this invention is the adipodinitrile carbonate which has the structure:

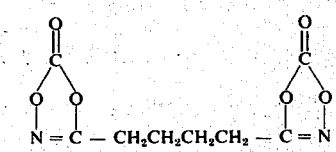

The higher molecular weight adducts, wherein $n$ is 5 or higher, can be prepared by the homopolymerization of the vinyl derivatives of the cyclic nitriles, for example, vinyl nitrile carbonate having the structure:

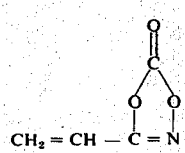

or the above described analogues

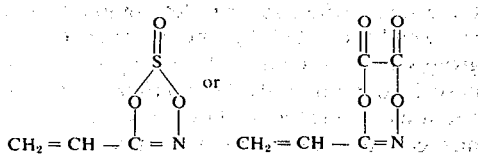

Likewise these vinyl compounds can be copolymerized with one or more polymerizable monomers, for example, olefinically unsaturated hydrocarbons, esters, ethers, aldehydes, ketones, nitriles, amides, halogen compounds, carboxylic acid or anhydride compounds and like monomers which are not nucleophilic compounds, i.e. those free of reactive hydrogen atoms as determined by the Zerewitinoff test, or free of positive metal ions or a positive ammonium ion which would react with the cyclic nitrile group. Examples are the mono- and diolefins such as ethylene, propylene, butadiene, styrene, vinyl ethers, vinyl esters, the acrylates, methacrylates, acrylonitrile, vinyl chloride, maleic anhydride and the like. The production of these high molecular polycyclic nitrile adducts is likewise disclosed in U.S. Pats. Nos. 3,480,595 and 3,652,507, both of which are incorporated herein by reference.

The polymerization can be catalyzed by conventional polymerization catalysts, particularly of the free-radical type such as the peroxide type compounds, e.g. benzoyl peroxide, the azo compounds, ultra-violet light, and beta or gamma irradiation.

THE ACRYLIC INTERPOLYMERS

The acrylic interpolymers which are employed in the method of this invention are any of those used in the production of thermosetting resins. In general they are available either as aqueous emulsions or in solution in organic solvents. These acrylic interpolymers are made from a mixture of 1) alkyl esters of acrylic or methacrylic acids, 2) acrylic or methacrylic acid, 3) styrene and 4) hydroxy propyl (or ethyl) methacrylate and of hydroxyl numbers ranging from 20 to 150 and acid numbers ranging from 0 to 25. Preferably the hydroxyl numbers range from 40 to 80 and acid numbers range from 5 to 15. Considerable variation in these interpolymers is possible by varying the various quantities of the components and methods of polymerization. These, however, are well-known in the art and it is only necessary that they be provided with hydroxyl functionalities as described in order that they can be crosslinked with the cyclic nitrile adducts in accordance with this invention.

THE CATALYSTS

The compounds which can be utilized to catalyze the crosslinking reaction of the cyclic nitrile adduct with the acrylic interpolymers include tertiary amines. The examples of these base catalysts are: pyridine, dimethyl aniline, triethylamine, trimethylamine, tri-n-propylamine, tri-n-butylamine, N-methlpiepridine, N-allyl-piepridine and the like.

The reaction is also catalyzed by contacting the reactants with catalytically-effective amounts of the combination of:

I. a first metal or a mixture of metals selected from the metals of Groups III through V of the Periodic Table, and II. a second metal or a mixture of metals selected from the metals of Groups I and II and the iron series of Group VIII of the Periodic Table.

The two metals are supplied to the catalyst combination as one or more compounds which are sufficiently soluble in the reaction mixture to allow for the metals to be dissolved in the reaction mixture in catalytically-effective amounts. Thus, the metals are not suitably employed in their insoluble elemental state in the catalyst combination. Preferably, there will be present in the catalyst combination about 0.2 to 4 molar equivalents of the first metal, i.e., the Groups III – V metal, per molar equivalent of the second metal, i.e., the Groups I, II or iron series metal. These catalysts are described in greater detail in U.S. Pat. No. 3,702,320 incorporated herein by reference.

A second series of similar metal catalysts consists of a compound of aluminum, tin, titanium, zinc, bismuth or iron which is soluble in the reaction mixture provided that the metal is in a valence state other than zero, further provided that when the metal is aluminum, tin, titanium or bismuth there is an absence of metal from Groups I, II or the iron series of Group VIII of the Periodic Table, and when the metal is zinc or iron the reaction is conducted in the absence of metals in Groups III to V of the Periodic Table. These catalysts are more fully described in U.S. Pat. No. 3,702,320 incorporated herein by reference.

Combinations of the aforementioned tertiary amine type catalysts with any one or combinations of the aforementioned metal compound type catalysts also can be employed.

REACTION CONDITIONS

The cyclic nitrile adducts and the acrylic interpolymers are preferably used in a one to one equivalent ratio in order to insure essentially complete crosslinking. In general, the commercial acrylic interpolymers are supplied in an organic solvent such as an aromatic or aliphatic compound, benzene being frequently employed. Thus additional solvent is not required to solubilize the cyclic nitrile adduct. The acrylic interpolymer solution, cyclic nitrile adduct and catalyst are heated moderately, generally to from 40°C. to 50°C. with stirring until solubilization of the mixture of components is complete then the mixture is applied hot, such as by brushing, spraying or the like, to the article to be coated in the form of a film which is then cured by heating to from 120°C to 150°C. although higher or lower temperatures can be used as well-known to the art. Times likewise are a function of the curing temperature, the particular acrylic interpolymer employed, the cyclic nitrile adduct and the catalyst. Thus it is not possible to give exact times, however, for many systems 2 hours at 120°C. is completely adequate, although this time may be shortened considerably using certain catalyst reactants and higher temperatures.

In the Examples which follow the invention is illustrated by employing adipodinitrile carbonate as the crosslinking agent with a commercially available acrylic interpolymer containing the four components described hereinbefore and characterized by having an hydroxyl number of 60 and an acid number of 13.5. It is supplied as a liquid containing 50 percent solids by weight.

Films of these reactants were compared with films made by the prior art method employing commercial melamine-formaldehyde resins as the crosslinking agent.

EXAMPLE I

The acrylic interpolymer and adipodinitrile carbonate were reacted in a one to one equivalent ratio. The equivalent weight of the acrylic interpolymer was determined by the hydroxyl number (60) and acid number (13.5). The equivalent weight of the adipodinitrile carbonate was calculated from its theoretical molecular weight divided by 2. Zinc octoate catalyst was used at the 0.4 weight percent level based on the adipodinitrile carbonate. The weights of reactants used:

| | |
|---|---|
| Acrylic interpolymer (50% solids by wt.) | 34.62 g. |
| Adipodinitrile carbonate | 5.18 g. |
| Zinc octoate | 0.021g. |

The reactants and catalyst were heated to 40°C. under a dry nitrogen atmosphere to complete solution. The solution was applied hot as a film on aluminum panels and the films were cured at 120°C. for 2 hours.

EXAMPLE II

Prior art type films were made from the same acrylic interpolymer using melamine in accordance with the amounts suggested by the supplier. The melamine used was a 3:1 mixture of a melamine-formaldehyde resin and a butylated melamine-formaldehyde resin. The films on aluminum panels were cured at 120°C. for 2 hours.

EXAMPLE III

The test panels made from films in accordance with this invention, i.e. those of Example I, were compared with prior art films, i.e., Example II, by obtaining impact data using the Gardner falling weight tester. The results are shown in the Table.

TABLE

| Impact Force on Coated Side of Panel | Adipodinitrile Crosslinked Films | Melamine(Prior Art) Crosslinked Films |
|---|---|---|
| 10 inch pounds | no cracking | no cracking |
| 20 inch pounds | no cracking | cracking |
| 40 inch pounds | no cracking | cracking |
| 80 inch pounds | no cracking | cracking |

While tests on the reverse side showed substantially no difference these results on the test of greater severity showed the crosslinked films produced in accordance with this invention had greatly superior impact strength.

EXAMPLE IV

In order to determine the resistance to solvents panels made in Example I and in Example II were soaked 24 hours in cellosolve acetate (2-ethoxyethyl acetate). The panels were scratched on the coated side of the panel. The adipodinitrile carbonate crosslinked acrylic films showed a much higher scratch resistance than the prior art melamine crosslinked acrylic films.

The negligible effect of the solvent on the adipodinitrile carbonate-acrylic panels showed that excellent crosslinking was obtained in accordance with this invention.

We claim:

1. A thermally cross-linkable coating composition comprising
    A. an acrylic interpolymer having an hydroxyl number of 40 to 80 and an acid number of 5 to 15 comprised of:
        1. an alkyl ester of acrylic or methacrylic acid,
        2. acrylic or methacrylic acid,
        3. styrene, and
        4. hydroxy propyl or hydroxy ethyl methacrylate
    B. a cyclic nitrile having the structure:

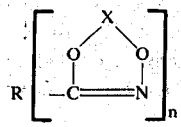

wherein R is an organic radical free of nucleophilic groups and having from 2 to about 200,000 carbons atoms, X is:

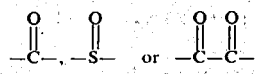

and n ranges from 2 to about 100,000,
    C. a catalyst selected from:
        I. a tertiary amine or
        II
            a. a compound of first metal or a mixture of metals selected from the metals of Groups III through V of the Periodic Table, which is soluble in the reaction mixture, and
            b. a compound of second metal or a mixture of metals selected from the metals of Groups I and II and the iron series of Group VIII of the Periodic Table, which is soluble in the reaction mixture or
        III. a compound of aluminum, tin, titanium, zinc, bismuth or iron which is soluble in the reaction mixture, provided that the metal is in a valence state other than zero, further provided that when the metal compound is a compound of aluminum, tin, titanium or bismuth that said contacting is in the substantial absence of metals of Groups I, II and the iron series of Group VIII of the Periodic Table, and further provided that when the metal compound is a compound of zinc or iron that said contacting is in the substantial absence of metals of Groups III through V of the Periodic Table.

2. The composition of claim 1 wherein the acrylic interpolymer, cyclic nitrile, and catalyst are dissolved in an organic solvent.

3. The composition of claim 2 wherein said acrylic interpolymer has a hydroxyl number of about 40 to 80 and an acid number of about 5 to 15.

4. The composition of claim 2 wherein said cyclic nitrile is a polymer or a monomer selected from the group consisting of the vinyl cyclic nitriles having the structure

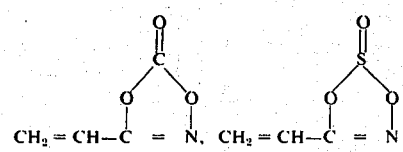

and

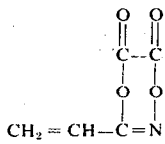

5. The composition of claim 4 wherein said vinyl cyclic nitrile is copolymerized with an olefinically unsaturated monomer which is free of reactive hydrogen atoms, positive metal ions or a positive ammonium ion.

6. The composition of claim 2 wherein said cyclic nitrile is adipodi(nitrile carbonate).

7. The composition of claim 2 wherein the catalyst is zinc octoate.

8. A coating composition comprising
   A. an acrylic interpolymer having an hydroxyl number of 40 to 80 and an acid number of 5 to 15 comprised of:
      1. an alkyl ester of acrylic or methacrylic acid,
      2. acrylic or methacrylic acid,
      3. styrene, and
      4. hydroxy propyl or hydroxy ethyl methacrylate
   (B) a cyclic nitrile having the structure:

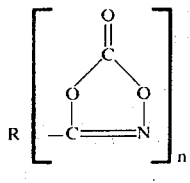

wherein R is an organic radical free of nucleophilic groups and having from 2 to about 200,000 carbon atoms and $n$ ranges from 2 to about 100,000
C. a catalyst selected from:
   1. a tertiary amine or
   II
      a. a compound of first metal or a mixture of metals selected from the metals of Groups III through V of the Periodic Table, which is soluble in the reaction mixture,
      b. a compound of second metal or a mixture of metals selected from the metals of Groups I and II and the iron series of Group VIII of the Periodic Table, which is soluble in the reaction mixture or
   III. a compound of aluminum, tin, titanium, zinc, bismuth or iron which is soluble in the reaction mixture, provided that the metal is in a valence state other than zero, further provided that when the metal compound is a compound of aluminum, tin, titanium or bismuth that said contacting is in the substantial absence of metals of Groups I, II and the iron series of Group VIII of the Periodic Table, and further provided that when the metal compound is a compound of zinc or iron that said contacting is in the substantial absence of metals of Groups III through V of the Periodic Table (D) a solvent in which the acrylic interpolymer, cyclic nitrile, and catalyst are soluble.

* * * * *